(12) United States Patent
Marquette et al.

(10) Patent No.: US 10,179,526 B2
(45) Date of Patent: Jan. 15, 2019

(54) ENHANCED CLIMATE SEAT WITH ASYMMETRIC THERMAL MANAGEMENT SYSTEM AND METHOD

(71) Applicant: Gentherm Inc., Northville, MI (US)

(72) Inventors: David Brian Marquette, Farmington Hills, MI (US); Daniel Charles Guerithault, Ann Arbor, MI (US)

(73) Assignee: Gentherm Inc., Northville, MI (US)

( * ) Notice: Subject to any disclaimer, the term of this patent is extended or adjusted under 35 U.S.C. 154(b) by 0 days.

(21) Appl. No.: 15/150,543

(22) Filed: May 10, 2016

(65) Prior Publication Data

US 2016/0332549 A1 Nov. 17, 2016

Related U.S. Application Data

(60) Provisional application No. 62/160,327, filed on May 12, 2015.

(51) Int. Cl.
*B60N 2/56* (2006.01)

(52) U.S. Cl.
CPC ......... *B60N 2/5657* (2013.01); *B60N 2/5635* (2013.01); *B60N 2/5642* (2013.01); *B60N 2/5685* (2013.01); *B60N 2/5692* (2013.01)

(58) Field of Classification Search
CPC ...... B60N 2/56; B60N 2/5607; B60N 2/5621; B60N 2/5657; B60N 2/5685
See application file for complete search history.

(56) References Cited

U.S. PATENT DOCUMENTS

| 6,857,697 | B2 | 2/2005 | Brennan et al. |
| 7,201,441 | B2 | 4/2007 | Stoewe et al. |
| 7,587,901 | B2 * | 9/2009 | Petrovski ................. A47C 7/74 62/3.3 |
| 7,827,805 | B2 * | 11/2010 | Comiskey ............ B60N 2/5635 62/244 |
| 7,828,050 | B2 | 11/2010 | Esaki |
| 7,931,330 | B2 | 4/2011 | Itou et al. |

(Continued)

FOREIGN PATENT DOCUMENTS

| JP | 2003042590 A | 2/2003 |
| KR | 102010011726 A | 10/2010 |

(Continued)

OTHER PUBLICATIONS

Article—Development of S-FLOW System & Control. Koichi Tabei Published Apr. 8, 2013. Downloaded from SAE International Mar. 23, 2018. pp. 1-9.

(Continued)

*Primary Examiner* — Philip F Gabler
(74) *Attorney, Agent, or Firm* — Carlson, Gaskey & Olds, P.C.

(57) ABSTRACT

A method of conditioning a seat includes operating a first thermal conditioning assembly in a seat back configured to support an occupant torso. The first thermal conditioning assembly provides a first heat transfer rate. A second thermal conditioning assembly is operated in a seat cushion configured to support occupant lower region. The second thermal conditioning assembly provides a second heat transfer rate simultaneously with and different than the first heat transfer rate.

13 Claims, 6 Drawing Sheets

(56) References Cited

U.S. PATENT DOCUMENTS

| | | | |
|---|---|---|---|
| 8,505,320 B2* | 8/2013 | Lofy | B60N 2/5657 |
| | | | 62/150 |
| 8,777,320 B2 | 7/2014 | Stoll et al. | |
| 9,105,808 B2* | 8/2015 | Petrovski | B60N 2/5628 |
| 9,168,852 B2 | 10/2015 | Line et al. | |
| 2004/0164594 A1* | 8/2004 | Stoewe | B60N 2/5635 |
| | | | 297/180.14 |
| 2006/0175877 A1 | 8/2006 | Alionte et al. | |
| 2008/0173022 A1* | 7/2008 | Petrovski | B60N 2/5628 |
| | | | 62/3.2 |
| 2009/0033130 A1 | 2/2009 | Marquette et al. | |
| 2009/0134675 A1 | 5/2009 | Pfahler | |
| 2012/0080911 A1* | 4/2012 | Brykalski | A47C 7/744 |
| | | | 297/180.15 |

FOREIGN PATENT DOCUMENTS

| | | |
|---|---|---|
| WO | 2008036531 | 3/2008 |
| WO | 2009097572 | 8/2009 |
| WO | 20090097572 | 8/2009 |

OTHER PUBLICATIONS

Korean Office Action for Korean Application No. 10-2016-0057868 dated Mar. 29, 2018.
CN Office Action for CN Application No. 201610542869.8 Notification dated Dec. 14, 2017.
CN Office Action for CN Application No. 201610542869.8 Notification dated May 23, 2018.
Japanese Office Action for Japanese Patent Application No. 2017-156977 dated Jun. 5, 2018.

* cited by examiner

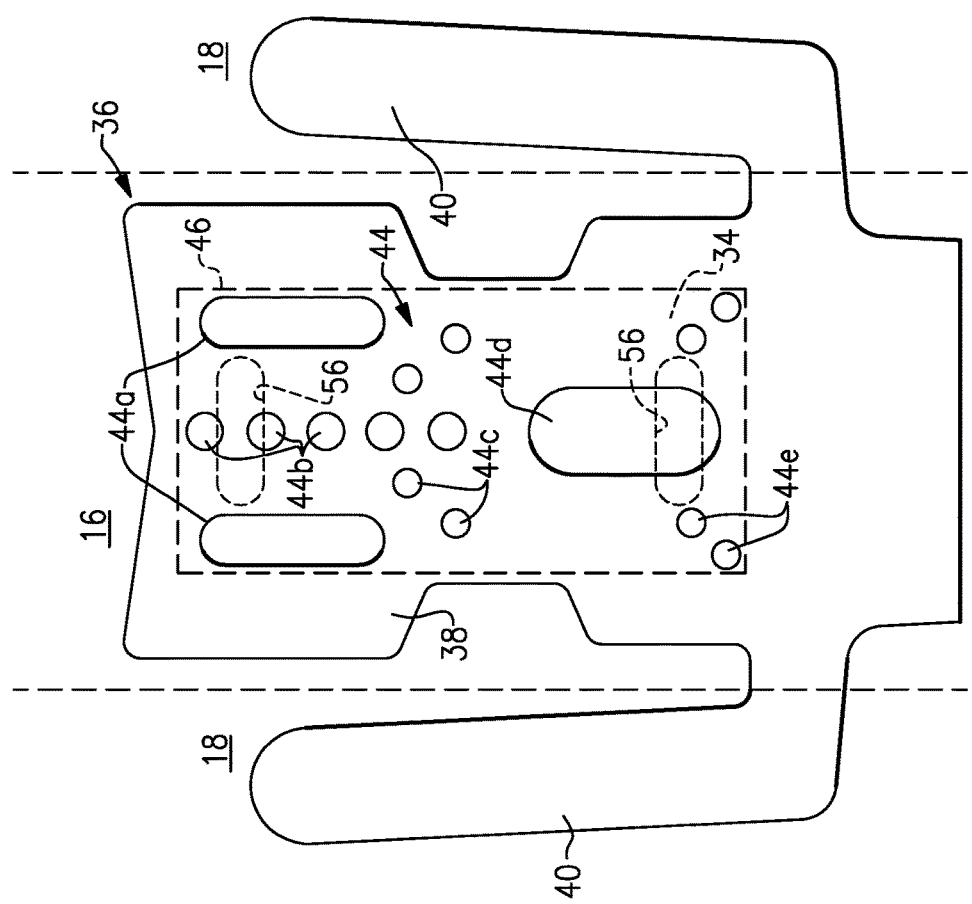
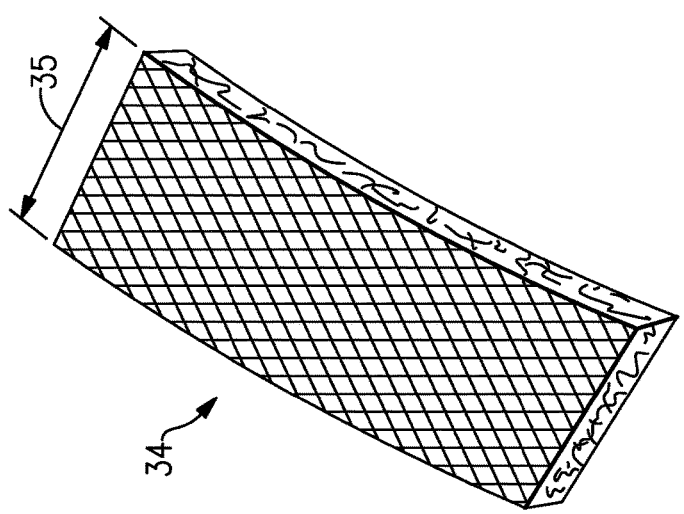

ENHANCED CLIMATE SEAT WITH ASYMMETRIC THERMAL MANAGEMENT SYSTEM AND METHOD

CROSS-REFERENCE TO RELATED APPLICATIONS

This application claims priority to U.S. Provisional Application No. 62/160,327, which was filed on May 12, 2015 and is incorporated herein by reference.

BACKGROUND

This disclosure relates to an enhanced thermally conditioned climate seat and a method for operating the same.

Thermally conditioned seats are increasingly used in vehicles to provide a more comfortable microclimate for vehicle occupants. In such seats it is common to heat or cool both the seat bottom and seat back simultaneously and uniformly in response to a user input via a switch. In one type of thermally conditioned seat, the heater in the seat back may be separately energized with the heater in the seat bottom off.

A variety of approaches have been used to cool a seat. In one example, generally, cooled air flows through passages in the seat to provide cooled fluid through perforations in the exterior of the seat's cover. The cooled fluid may be provided from the vehicle heating, ventilation and cooling (HVAC) system or by using a thermoelectric device, such as a Peltier device.

In one type of cooling arrangement, a bag is supported on a polyurethane foam seat portion. Side bolsters are provided on either side of the seat portion. Typically, the bag extends the entire width of the seat portion to the bolsters. The bag includes a plastic exterior providing a cavity within which a breathable spacer material, such as a woven textile, is arranged to keep the cavity opened so that air may pass through the cavity. Holes are provided in the bag's plastic exterior. A cover is arranged over the bag and seat portion. The cover includes an air permeable layer adjacent to the bag and an aesthetic layer that includes perforations. A blower supplies cooled fluid to the bag and flows through the breathable spacer material and out holes in the plastic exterior. The cooled fluid is then distributed by the air permeable layer and out the perforations in the aesthetic layer.

In another type of cooling arrangement, channels are provided in the foam seat portion. The cover is arranged on the seat portion over the channels, and the blower provides cooled fluid to the channels. The cooled fluid flows from the channels into the air permeable layer and out the perforations in the aesthetic layer.

SUMMARY

In one exemplary embodiment, a method of conditioning a seat includes the steps of operating a first thermal conditioning assembly in a seat back configured to support an occupant torso. The first thermal conditioning assembly provides a first heat transfer rate. A second thermal conditioning assembly is operated in a seat cushion configured to support occupant lower region. The second thermal conditioning assembly provides a second heat transfer rate simultaneously with and different than the first heat transfer rate.

In a further embodiment of the above, the first and second thermal conditioning assembly operating steps includes providing cooling to the seat back and the seat cushion.

In a further embodiment of any of the above, the first heat transfer rate is greater than the second heat transfer rate.

In a further embodiment of any of the above, the first thermal conditioning assembly operating step includes blowing a fluid through a thermoelectric device.

In a further embodiment of any of the above, the second thermal conditioning assembly operating step includes blowing a fluid from a blower inlet to a seat cushion support surface without supplementing cooling of the fluid.

In a further embodiment of any of the above, the first thermal conditioning assembly operating step is initiated prior to the second thermal conditioning assembly operating step.

In a further embodiment of any of the above, first and second heat transfer rates are different for a first period of time, and the first and second heat transfer rates are substantially the same for a second period of time subsequent to the first period of time.

In a further embodiment of any of the above, the first thermoelectric assembly operating step draws a first current and the second thermoelectric assembly operating step draws a second current. The first current is greater than the second current by at least 2 times.

In a further embodiment of any of the above, the first current is greater than the second current by at least 4 times.

In a further embodiment of any of the above, the first current is greater than the second current by at least 8 times.

In another exemplary embodiment, a thermally conditioned seat includes a seat portion constructed from a first material which includes a seat support structure that has a central support region and adjacent side bolsters laterally spaced apart from one another a width. A recess is provided in the central support region and includes an aperture. A porous material is arranged in the recess against the first material. A second material is arranged against the first material and the porous material. A cover includes an air permeable layer and an aesthetic layer that provides an exterior seating surface. The air permeable layer is arranged against the second material and the aesthetic layer has perforations. A blower is associated with the seat portion and is in fluid communication with the aperture. The blower is configured to supply a fluid through the aperture to the porous material through the recess. The fluid is configured to pass from the porous material to the air permeable layer and out the perforations.

In a further embodiment of any of the above, the first material is polyurethane foam.

In a further embodiment of any of the above, the seat portion is one of a seat bottom or a seat back.

In a further embodiment of any of the above, the width is a first lateral width. The porous material has a second lateral width that is less than 75% of the first lateral width.

In a further embodiment of any of the above, the second lateral width is 35-65% of the first lateral width.

In a further embodiment of any of the above, the porous material is a breathable spacer material.

In a further embodiment of any of the above, the second material is fleece.

In a further embodiment of any of the above, heating elements are supported on the fleece on a side opposite the porous material.

In a further embodiment of any of the above, the air permeable layer and the aesthetic layer are joined to one another at stitched seams.

In a further embodiment of any of the above, a thermoelectric device is arranged between the blower and the recess. The thermoelectric device is configured to cool the fluid.

In a further embodiment of any of the above, the second material is impermeable and has an opening. The fluid is configured to pass from the porous material through the opening to the air permeable layer and out the perforations.

In another exemplary embodiment, a method of providing conditioned fluid to a seated occupant includes passing the conditioned fluid through an opening in a barrier layer and providing an initial focused thermal flow through a perforate layer. The conditioned fluid is distributed through an air permeable layer between the barrier layer and the perforate layer. An expanded thermal flow is provided through the perforate layer relative to and subsequent to the initial focused thermal flow.

In a further embodiment of any of the above, the moving step includes blowing air over a thermoelectric device to provide a cooled conditioned fluid.

In a further embodiment of any of the above, conditioned fluid is moved through a porous material. The passing step includes passing the conditioned fluid through an opening in a barrier layer arranged over the porous material.

In a further embodiment of any of the above, the barrier layer is a polyurethane foam cushion and the opening is a channel and hole in the foam cushion.

BRIEF DESCRIPTION OF THE DRAWINGS

The disclosure can be further understood by reference to the following detailed description when considered in connection with the accompanying drawings wherein:

FIG. 2 is a perspective view of a porous material.

FIG. 3 is an elevational view of a second material with heating elements omitted for clarity.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
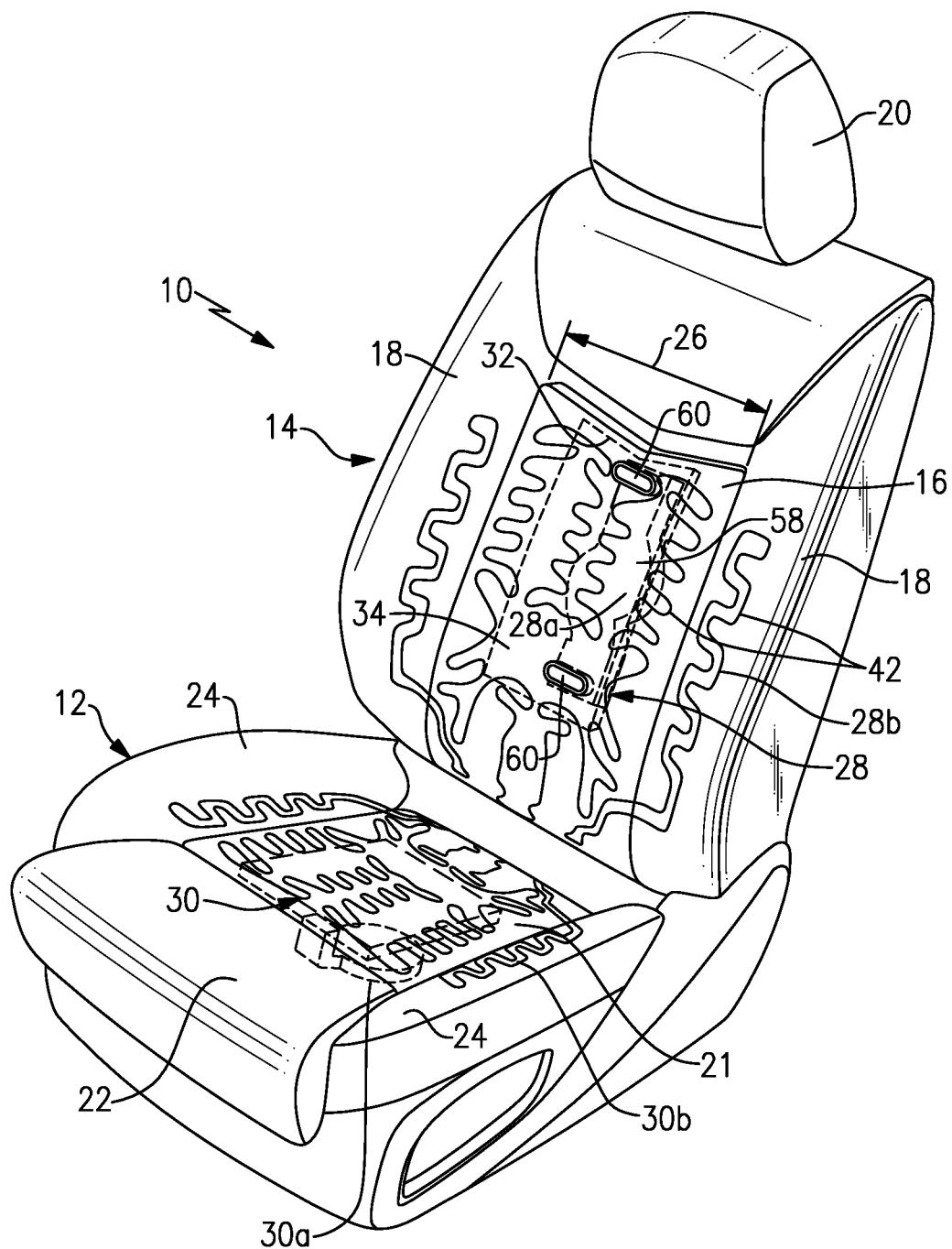
FIG. 1 is a perspective view of a seat embodiment illustrating first and second thermal conditioning modules.

One example vehicle seat 10 is schematically illustrated in FIG. 1. The seat 10 includes a seat bottom or cushion 12 and a seat back 14. The seat back 14 includes a seat portion having a central support region 16 with bolsters 18 laterally spaced apart from one another a first lateral width 26. A headrest 20 is provided on the central support region 16. The bottom 12 includes a seat portion having a central support region 21 provided with laterally spaced apart bolsters 24 spaced apart a width and a thigh bolster 22, which may be adjustable with respect to the central support region 21. The seat portions are constructed from a first material, such as polyurethane foam.

A first thermal conditioning assembly 28 is provided in the seat back 14, and a second thermal conditioning assembly 30 is provided in the seat bottom 12. The thermal conditioning assemblies are shown in phantom beneath the seats exterior surface in FIG. 1. In the example, each of the first and second thermal conditioning assemblies 28a, 28b include both first and second heating and cooling devices 28a, 28b and 30a, 30b, respectively. In the case of the example seat back 14, the cooling may be provided by a thermal cooling module that has an active cooling element, for example, a Peltier device, and a blower. In the case of the example seat bottom, the cooling may be provided by convection cooling using a blower with ventilation only. It should be understood, however, that different and/or additional heating and/or cooling components may be used than shown. For example, the seat bottom 12 and/or seat back 14 may not include a heating device.

The seat back is referenced in the following illustrated example, although the disclosed embodiment may also be used in the seat bottom. A porous material 34 is provided in a recess 32 of the polyurethane foam seat portion. The porous material 34 extends a second lateral width 35 that is substantially less than the first lateral width 26, for example, less than 75%. In another example, the second lateral width 35 is 35%-65% of the first lateral width 26. As a result, the porous material 34, which distributes conditioned fluid to the occupant through the seat support surface, provides much more focused cooling of key thermally responsive areas of the occupant's body, providing a quicker thermal response in areas most needed to achieve comfort.

The porous material 34 is a breathable spacer material, for example, constructed from woven textiles. The breathable spacer material includes woven layers spaced apart from one another, as best shown in FIG. 2. Pile yarns interconnect the woven layers. The number, size, orientation and material characteristics of the pile yarn determine the cushioning characteristics provided by the porous material. Voids are provided between the pile yarns to permit fluid flow. Example breathable spacer materials are a reticulated foam, or 3-D MESH® available from Mueller Textiles.

Referring to FIG. 3, a second material 36, such as a fleece or felt, supports heating elements 42, which provide the heating devices 28b, 30b, as shown in FIG. 1. It should be understood that other materials may be used for the second material 36, such as a scrim or heater element carrier material. The second material 36 includes a central portion 38 secured to the central support region 16 over the porous material 34, shown in phantom in FIG. 3. Wings 40 extend from the central portion 38 and are supported on the bolsters 18. The heating elements 42 are omitted from FIG. 3 for clarity, but are shown in FIG. 1.

The second material 36 acts as a barrier layer and includes openings 44a-44e, collectively referred to as "openings 44," that permit fluid to pass from the recess 32 through the porous material through the second material 36. The second material 36 is otherwise substantially impermeable, in one example embodiment, which enables more focused cooling initially than that provided by the areal dimensions of the porous material 34 (e.g., FIG. 3 or 4B). In another example embodiment, the second material 36 may be substantially permeable, which provides initial cooling that corresponds to the areal dimensions of the porous material 34 (e.g., FIG. 4A).

It is difficult to objectively quantify a person's thermal state, e.g., sensations and comfort, (collectively referred to as "occupant thermal condition") such that a thermal conditioning system can be automatically controlled to achieve a desired thermal sensation and comfort for that person. As one example, an occupant thermal condition or state can be a condition of sensing a hot or cold temperature, or changes in temperature. As another example, an occupant thermal condition or state can be a condition of feeling comfortable or uncomfortable, a level of comfort, or a change in a level of comfort. One widely recognized approach that attempts to objectively quantify a person's thermal condition is referred to as the Berkeley Sensation and Comfort Scale ("Berkeley scale"), described in, for example, Arens E. A., Zhang H. & Huizenga C. (2006) Partial- and whole-body thermal sensation and comfort, Part I: Uniform environmental conditions. *Journal of Thermal Biology*, 31, 53-59. It should be understood that other approaches can be used to quantify an occupant's thermal condition.

Using the Berkeley scale, thermal sensation is quantified from +4 to −4 by a person. A more positive number corresponds to an increasing degree of perceived heat, and a more negative number corresponds to an increasing degree of perceived cold. High positive or negative numbers are indicative of painfully hot or painfully cold conditions respectively. A zero indicates the person is neutral as to any thermal sensation. Thermal comfort on the Berkeley scale is quantified from +4 to −4 by a person, where a +4 indicates a person is "very comfortable," and a −4 indicates a person is "very uncomfortable."

Figure 3A:
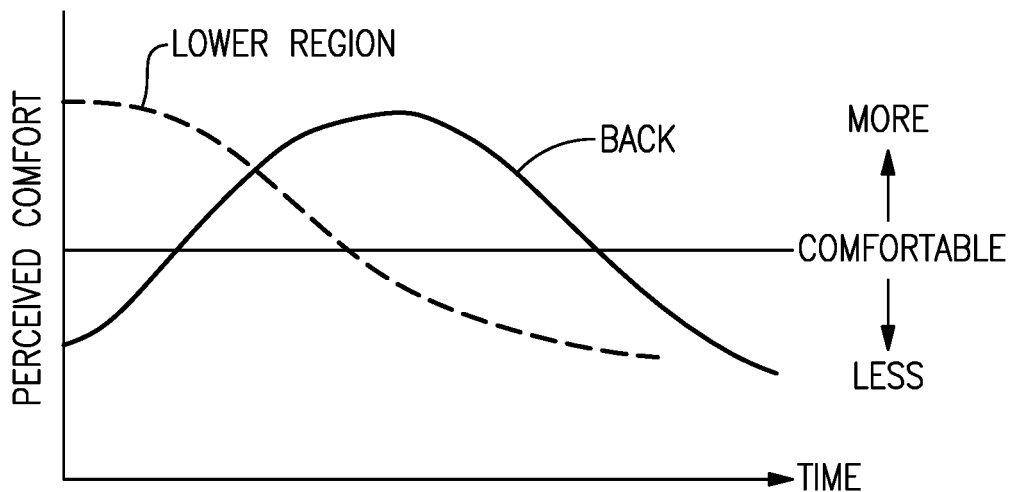
FIG. 3A is a graph depicting a typical perceived comfort of an occupant, which illustrates the occupant back and lower region comfort in response to a symmetric thermal management approach.

FIG. 3A graphically depicts a typical perceived comfort of an occupant and illustrates the difference between occupant back and lower region comfort in response to a typical symmetrical thermal management approach. More cooling power is needed to overcome the back metabolic heat rate, since the skin temperature of the back tracks more closely to the core body temperature.

Different areas of the body, for example, the back may perceive comfort differently or respond at a different rate to a thermal input. So, for example, rather than indiscriminately cooling the whole back, the openings (whether provided via the "A"-surface or "B"-surface) are sized and placed strategically at locations that correspond to thermally receptive areas of an occupant's back that will be more responsive to cooling and induce a quicker overall feeling of thermal comfort. For example, the openings 44a are positioned to align with the shoulder blades, the openings 44b align with the spine, the openings 44c, 44e are spaced along the sides of the back, and the openings 44d align with the small of the back.

Figure 4:
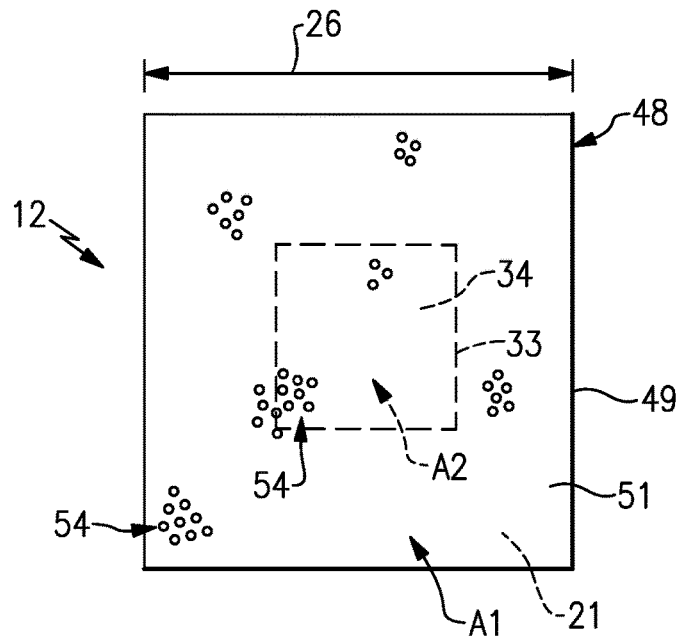
FIG. 4 is a schematic illustration of a focused conditioning zone relative to a seat support surface.

Referring to FIG. 4, a cover 48 includes an air permeable layer 52 and an aesthetic layer 50, which are typically secured to one another at a sewn seam. Perforations 54 are provided in the aesthetic layer 50, typically perforate leather, to permit cooled fluid to pass from the air permeable layer 52 through the perforations 54 to an exterior seating surface 51 to cool the seated occupant. In one example, the air permeable layer 52 is provided under the perforations 54 on the central support region 16 of the seat, but not on the bolsters.

Figure 4A:
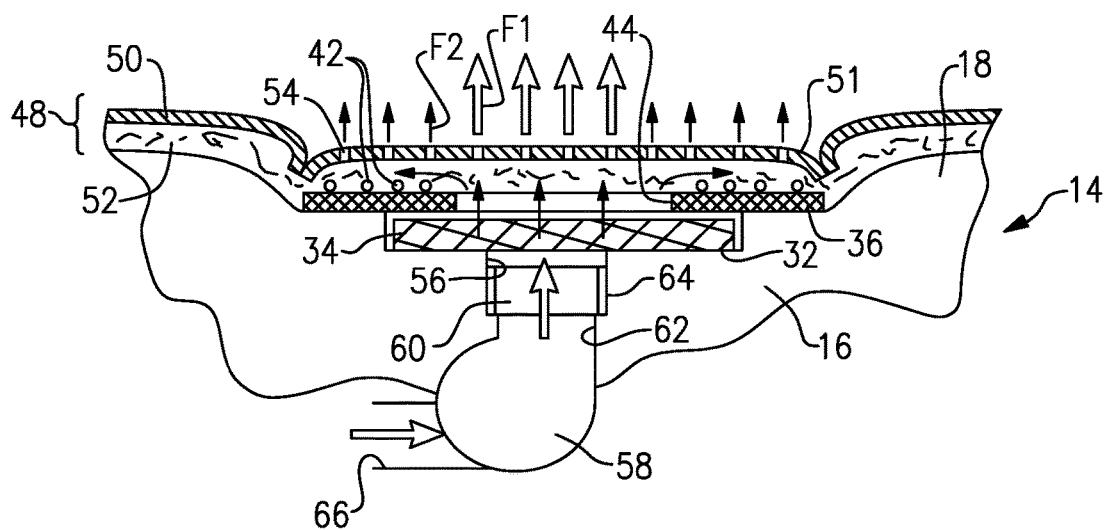
FIG. 4A is cross-sectional view through a seat portion and the first thermal conditioning module illustrating an initial distribution provided on an "A"-surface of a seat cushion.

Referring to FIG. 4A, a perimeter 49 of a cover 48 of the seat bottom 12 is schematically illustrated. The cover 48 includes perforations 54 (only some shown for clarity) across an area A1, which covers the central support region 21. The porous material 34 has a perimeter 33 about an area A2 to provide focused thermal conditioning with respect to occupant. The area A2 is less than 50% of the area A1, for example, and in one embodiment, the area A2 is 20%-50% of the area A1. The above relationship between first and second areas A1, A2 may also be used for the seat back 14.

In the example, the porous material 34 is arranged against or in engagement with the seat portion and the second material 36. The air permeable layer 52 is arranged against the second material 36 and the aesthetic layer 50. The porous material 34 acts as a plenum, and the second material 36 blocks the flow of fluid to all but the more thermally receptive parts of the occupant's body through the openings 44, as illustrated by large arrows F1. Then, over time, the cooling fluid is distributed through the air permeable layer 52 outward to the entire first lateral width 26, providing sustained cooling of the occupant's body, as illustrated by small arrows F2.

One or more apertures 56 are provided in the seat portion. A blower 58 includes an outlet 62 that is received in the aperture 56. "Blower" and "fan" are used interchangeably in this disclosure. A foam gasket 64 may be provided between the outlet 62 and the seat portion for better sealing. The blower 58 receives fluid from an inlet 66, which may be positioned beneath the seat 10, and supplies the inlet air through a thermoelectric device (TED) 60, such as a Peltier device, to cool the fluid.

Figure 4B:
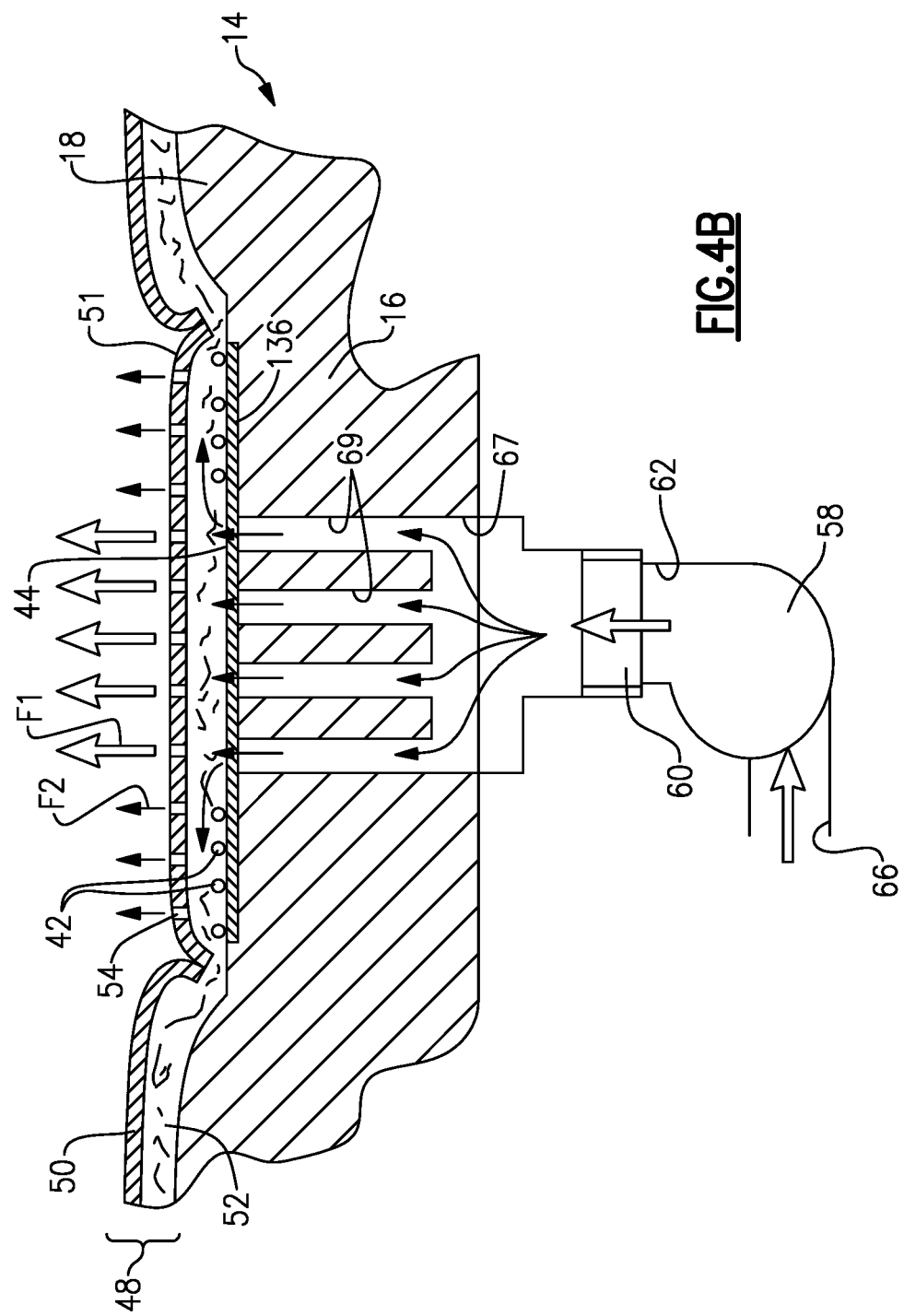
FIG. 4B is cross-sectional view through a seat portion and the first thermal conditioning module illustrating an initial distribution provided on a "B"-surface of the seat cushion.

The above described embodiment achieves focused delivery of conditioned air to the occupant along the "A"-surface of the seat foam. Alternate embodiments for asymmetric conditioning could utilize "B"-surface distribution where channels 67 or pocket of distribution occurs along the bottom side of the foam and is distributed to the "A"-surface via an array of through holes 69, as shown in FIG. 4B. Elements in FIG. 4B that are common to FIG. 4A use the same numerals. The second material 136 is permeable in the embodiment shown in FIG. 4B. The through holes 69 can be located to allow conditioning to the key sensory mechanisms of the body (i.e. along the spine or other areas of high thermal receptor concentration) and a fast response based targeting the human thermal physiology.

A "push" system for the cushion is described in the above embodiments. It should be understood that other embodiments may also be used, such as a "pull" system in the cushion to pull cabin air past the occupant into and out of the seat. A pull or push passive ventilation system in the seat bottom can be used in combination with an active cooling system in the seat back to provide asymmetric thermal conditioning. A push system may be used in the seat bottom in embodiments where active cooling is added.

A high performance embodiment may comprise asymmetric cooling complimented with a pull ventilation strategy. In this case, multiple TEDs are used to push active conditioning in the back along with an additional blower (or set of axial fans) to pull air flow from the cabin across the occupant into the seat. In the seat bottom, a single TED (or fewer TEDs than in the seat back) are used to push active conditioning in the seat bottom along with an additional blower (or set of axial fans) to pull air flow from the cabin across the occupant into the seat.

Figure 5:
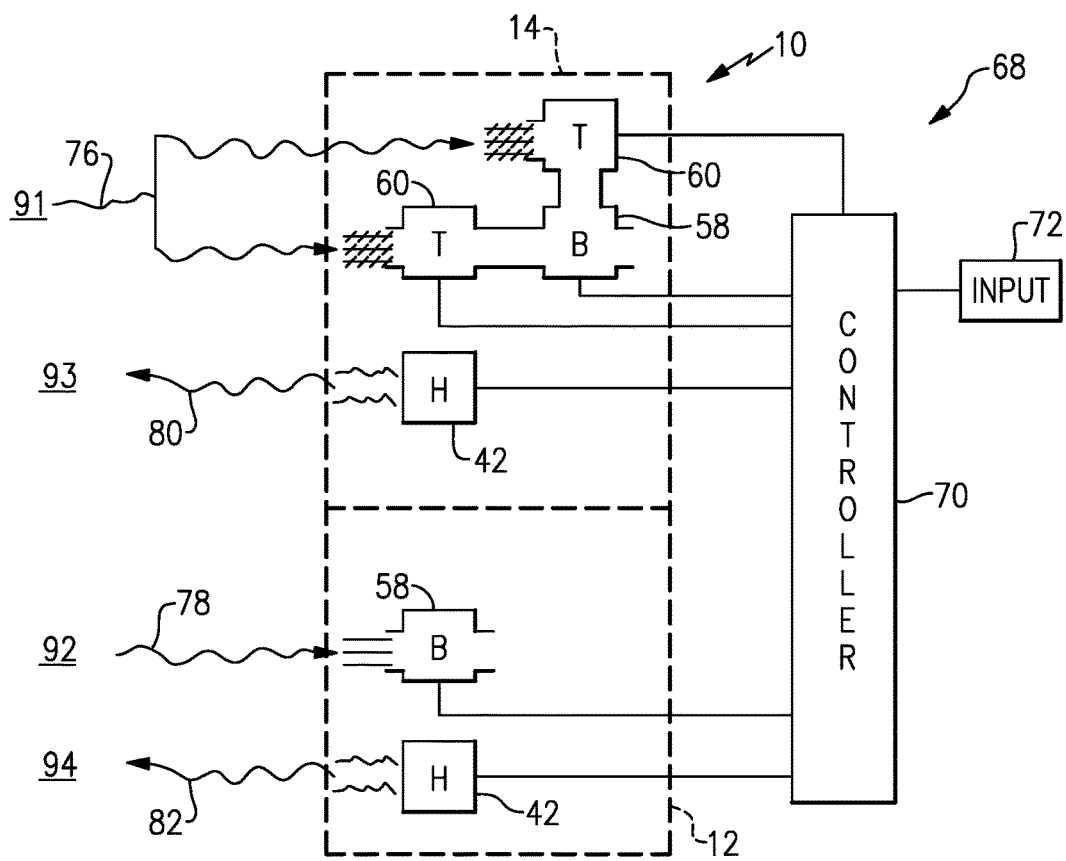
FIG. 5 is a schematic view of an example thermal conditioning system.

An example thermal conditioning system 68 is illustrated in FIG. 5. The heating elements 42, blowers 58 and TEDs 60 are in communication with a controller 70, which receives the command signals from an input 72. In one example, the seat back 14 may have a pair of TEDs 60 and the seat bottom 12 may have none. In another example, the seat back 14 may have a pair of TEDs 60 and the seat bottom may have one TED. In a lower cost embodiment, the seat back 14 is conditioned with one TED, and the seat bottom is conditioned passively with a blower only. Thus, it should be understood that various combinations of TEDs, blowers and heating elements may be used to achieve the desired level of heating/cooling. Generally speaking, however, the seat back 14 will have more heat transfer capability than the seat bottom 12.

A neck conditioning device may be incorporated into the headrest and controlled by the same controller 70, as disclosed in, for example, U.S. application Ser. No. 14/824,154, entitled, "VEHICLE HEADREST THERMAL CONDITIONER," filed Aug. 12, 2015 and assigned to the present applicant, which is incorporated herein by reference in its entirety. The neck conditioner can be used in combination with a climate seat having asymmetric thermal management to further maximize occupant comfort and initial sensation.

The input 72 may be a 3-position switch for the level of heating/cooling and a 2-position switch for selecting between heating or cooling modes. The blower 58 may be controlled independently, if desired. Different and/or additional inputs may be used, including sensors. One example input is provided by a passive infrared (PIR) sensor to obtain an infrared (IR) image of a face of the occupant, as disclosed in U.S. Provisional Application Ser. No. 62/316,938, entitled "OCCUPANT THERMAL STATE DETECTION AND COMFORT ADJUSTMENT SYSTEM AND METHOD," filed on Apr. 1, 2016, which is incorporated herein by reference in its entirety. Accordingly to that disclosure, the controller 70 can be used to determine segments of the thermal image corresponding to the nose of the occupant and surrounding cheeks and forehead, for example. The system determines a difference in the nose temperatures and the surrounding cheeks and/or forehead, and determines the thermal state of the occupant based on the difference. The system monitors a trend in the thermal state, and adjusts a rate of heating or cooling of the occupant using the disclosed asymmetrical thermal system based on the occupant's thermal state and trend in the state. Other detection systems may be used to provide autonomous control of the disclosed asymmetrical thermal system, if desired.

Figure 3B:
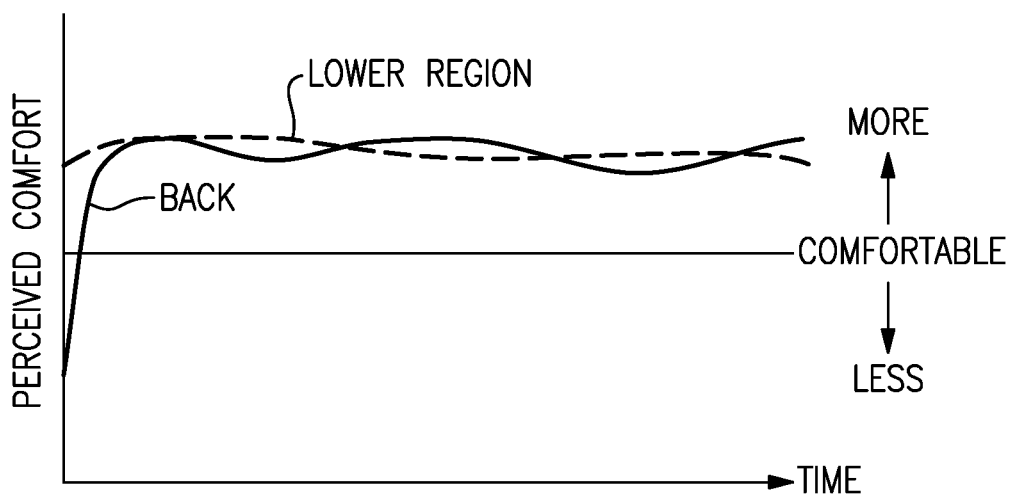
FIG. 3B is a graph depicting a typical perceived comfort of an occupant, which illustrates the occupant back and lower region comfort in response to an asymmetric thermal management approach.

An example method of conditioning the seat 10 using the thermal conditioning system 68 includes operating the first cooling device 28a in the seat back 14 to provide a first heat transfer rate 76 ($q_1$). The seat back needs more cooling than the seat bottom to reach localized occupant comfort, thus providing thermal conditioning in a substantially proportional manner to the occupant. Overcooling occurs faster in the seat bottom than the seat back at equivalent cooling power. Thus, the cooling of the seat back is prioritized over cooling of the seat bottom to reach occupant thermal equilibrium. To this end, the second cooling device 30a in the seat cushion 12 is operated to provide a second heat transfer rate 78 ($q_2$) simultaneously with and different than the first heat transfer rate 76. In the example, the first heat transfer rate 76 is greater than the second heat transfer rate 78 to provide more cooling to the occupant's back compared to their lower region, including the buttocks and the legs to compensate for the body's natural thermal physiological response, as depicted in FIG. 3B.

During periods of rest, for example prolonged vehicle driving, heat produced by core organs can be orders of magnitude greater than heat produced by peripheral tissues, for example 2:1, 3:1 or greater. During periods of rest, blood flow to core organs can be orders of magnitude greater than blood flow to peripheral tissue. During periods of relatively intense physical activity, cardiac output to peripheral tissues increases and continues for a period afterwards. During periods of intense physical activity and afterwards, heat produced by peripheral tissues can be greater than heat produced by core organs due to a combination of heat carried in the blood and heat produced by muscles. The thermally conditioned seat system can detect an occupant's thermal condition (e.g., using a PIR sensor) and adjust the first and second heat transfer rates accordingly. The first heat transfer rate 76 provided by the seat back 14 can differ from the second heat transfer rate 78 provided by seat cushion 12 in proportion to a difference in an amount of heat produced or absorbed by the occupant in corresponding regions conditioned by the seat back 14 and the seat cushion 12. For example, the first heat transfer rate 76 can differ from the second heat transfer rate 78 in proportion to the heat produced or absorbed by the occupant's body core (region conditioned by the seat back 14), and an amount of heat produced or absorbed by the occupant's buttocks and thighs (region conditioned by the seat cushion 12). This asymmetric thermal management approach provides enhanced comfort to the occupant compared to the symmetrical thermal management approach shown in FIG. 3A.

In one example mode of operation, the first thermal conditioning assembly 28, for example, the first cooling device 28a, is initiated prior to the second thermal conditioning assembly 30, for example the second cooling device 30a. The first and second heat transfer rates 76, 78 are different for a first period of time, and the first and second heat transfer rates 76, 78 subsequently become substantially the same for a second period of time. Thus, asymmetrical heat transfer rates are provided initially. Over time, the heat transfer rates provided by the seat back 14 and seat bottom 12 may be controlled to provide symmetrical heat transfer rates. This may be accomplished, for example, by decreasing the power to the seat back to correspond to the power provided by the seat bottom, or vice versa. In one embodiment, after employing asymmetric cooling, a control loop may be entered in which the asymmetric cooling is continued or is migrated toward symmetric cooling or some combination based on any known inputs or sensors.

The vehicle manufacturer only affords a seat manufacturer a limited amount of power consumption for climate controlled seats. The disclosed thermal conditioning system 68 makes better use of the available power for the climate controlled seat. The first thermal conditioning assembly 28, for example, the first cooling device 28a, draws a first current when cooling initially, and the second thermal conditioning assembly 30, for example, the second cooling device 30a, draws a second current initially. The first current is greater than the second current by at least a 2 times, for example. In one embodiment, the first current is greater than the second current by at least a 4 times, and in another embodiment, the first current is greater than the second current by at least an 8 times. Cooling the occupant's back quickly has a greater impact on overall occupant thermal comfort than cooling the occupant by evenly distributing the available current between the seat back and seat bottom. Voltage and/or current monitoring of the vehicle battery and/or the thermal management components can be used to regulate the disclosed climate seat. The asymmetric thermal management system can be operated, regulated, or optimized according to voltage input. Output voltage to devices can be directed to maximize thermal comfort.

The heating elements 42 in the seat back 14 and seat cushion 12, which respectively provide third and fourth heat transfer rates 80, 82 ($q_3$, $q_4$) may be controlled in a manner similar to the cooling function described above, if desired.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of conditioning a seat comprising the steps of:
   operating a first thermal conditioning assembly in a seat back configured to support an occupant torso, the first thermal conditioning assembly providing a first heat transfer rate; and
   operating a second thermal conditioning assembly in a seat cushion configured to support occupant lower region, the second thermal conditioning assembly providing a second heat transfer rate simultaneously with and different than the first heat transfer rate, wherein the first thermal conditioning assembly operating step includes operating the first thermal conditioning assembly in the seat back so that the first heat transfer rate remains greater than the second heat transfer rate provided by the second thermal conditioning assembly operating step for a predetermined period.

2. The method according to claim 1, wherein the first and second thermal conditioning assembly operating steps includes providing cooling to the seat back and the seat cushion.

3. The method according to claim 2, wherein the first thermal conditioning assembly operating step includes blowing a fluid through a thermoelectric device.

4. The method according to claim 3, wherein the second thermal conditioning assembly operating step includes blowing a fluid from a blower inlet to a seat cushion support surface without supplementing cooling of the fluid.

5. The method according to claim 1, wherein the first thermal conditioning assembly operating step is initiated prior to the second thermal conditioning assembly operating step.

6. The method according to claim 1, wherein first and second heat transfer rates are different for a first period of time of the predetermined period, and the first and second heat transfer rates are substantially the same for a second period of time subsequent to the first period of time following a change in occupant thermal comfort.

7. The method according to claim 6, comprising the step of detecting an occupant thermal condition corresponding to the occupant thermal comfort, the change in occupant thermal comfort corresponding to a difference in an amount of heat produced or absorbed by the occupant in corresponding torso and lower body regions conditioned by the seat back and the seat bottom.

8. The method according to claim 7, wherein the detecting step is performed using a passive infrared sensor.

9. The method according to claim 1, wherein the first thermal conditioning assembly operating step draws a first current, and the second thermal conditioning assembly operating step draws a second current, the first current being than the second current by at least 2 times.

10. The method according to claim 9, wherein the first current is greater than the second current by at least 4 times.

11. The method according to claim 10, wherein the first current is greater than the second current by at least 8 times.

12. The method according to claim 1, wherein the first and second thermal conditioning assembly operating steps are performed in response to an occupant comfort imbalance between the occupant torso on the seat back and the occupant lower region on the seat bottom, and comprising the step of changing at least one of the first and second heat transfer rates after the occupant comfort imbalance is reduced.

13. The method according to claim 12, wherein the first and second heat transfer rates are substantially the same after the occupant comfort imbalance is reduced.

* * * * *